(12) United States Patent
Thompson et al.

(10) Patent No.: US 12,612,157 B1
(45) Date of Patent: Apr. 28, 2026

(54) ROTOR WITH OFFSET

(71) Applicant: Textron Innovations Inc., Providence, RI (US)

(72) Inventors: George M. Thompson, Bedford, TX (US); Andrew Haldeman, Richland Hills, TX (US); Jonathan A. Knoll, Alvarado, TX (US); Timothy M. Mosig, Richland Hills, TX (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 19/333,040

(22) Filed: Sep. 18, 2025

(51) Int. Cl.
*B64C 27/41* (2006.01)
*B64C 11/46* (2006.01)
*B64F 5/10* (2017.01)

(52) U.S. Cl.
CPC .............. *B64C 27/41* (2013.01); *B64C 11/46* (2013.01); *B64F 5/10* (2017.01)

(58) Field of Classification Search
CPC .............. B64C 27/41; B64C 11/46; B64F 5/10
See application file for complete search history.

(56) References Cited

U.S. PATENT DOCUMENTS

| | | | |
|---|---|---|---|
| 9,950,787 B2 * | 4/2018 | Bammer | B64C 27/605 |
| 11,541,994 B2 * | 1/2023 | Clarke | B64C 27/32 |

* cited by examiner

*Primary Examiner* — Sabbir Hasan
(74) *Attorney, Agent, or Firm* — Whitaker Chalk Swindle & Schwartz PLLC; Enrique Sanchez, Jr.; Juan Vasquez

(57) ABSTRACT

A multi-planar rotor assembly for offset flapping hinges. In embodiments, the multi-planar rotor assembly includes an upper rotor disposed within a first vertical plane, and a lower rotor disposed within a second vertical plane vertically offset from the first vertical plane. A plurality of blade assemblies is coupled to the upper and lower rotors, with each blade assembly attached to a respective rotor via an offset flapping hinge positioned radially outward from a central rotational axis of the multi-planar rotor assembly. The upper and lower rotors are angularly offset relative to each other by a defined angular offset configured to establish a predetermined angular spacing between adjacent blade assemblies disposed across the first and second vertical planes. The multi-planar rotor assembly facilitates reduced flapping hinge offset distances, smaller rotor hub diameter, lower aerodynamic drag, reduced structural loads, improved maintenance access, and optimized control component clearances.

20 Claims, 12 Drawing Sheets

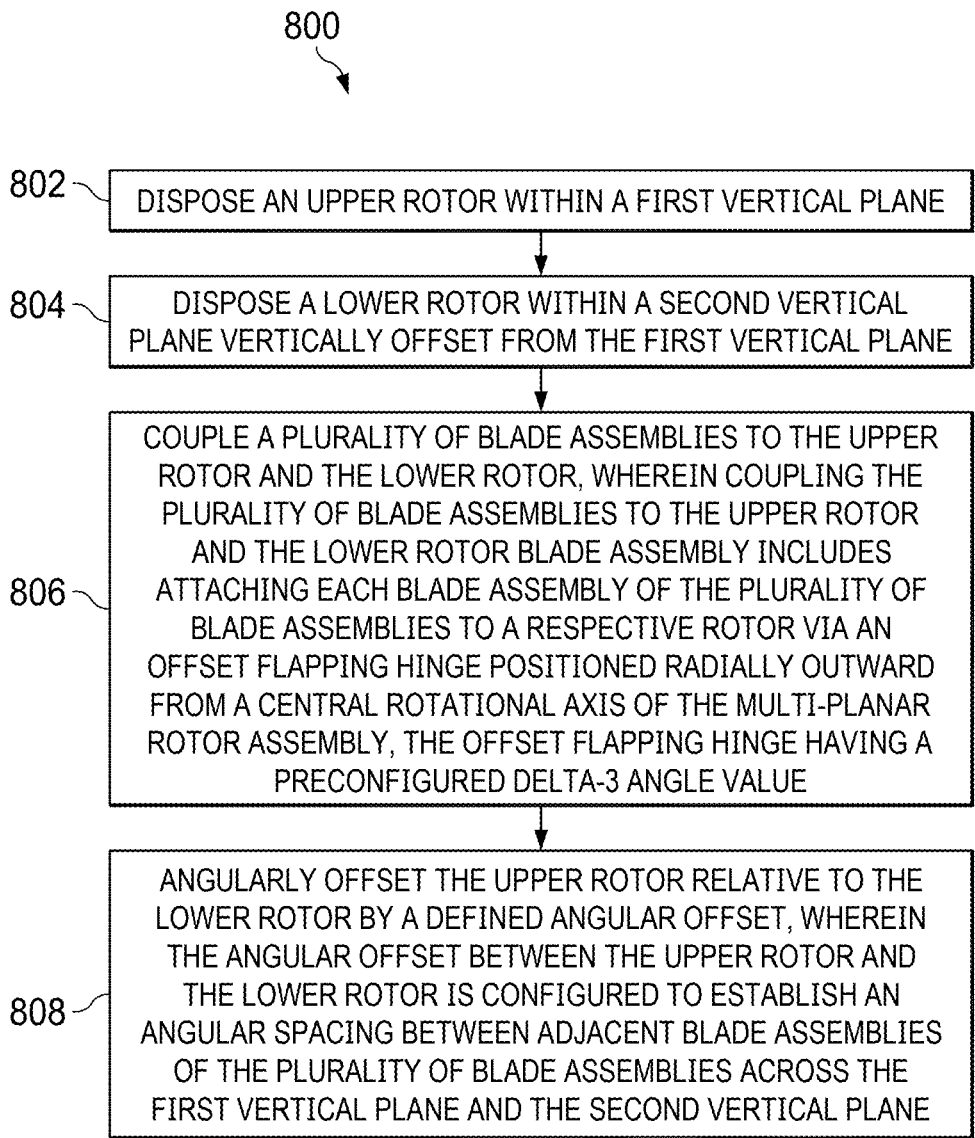

800

802 — DISPOSE AN UPPER ROTOR WITHIN A FIRST VERTICAL PLANE

804 — DISPOSE A LOWER ROTOR WITHIN A SECOND VERTICAL PLANE VERTICALLY OFFSET FROM THE FIRST VERTICAL PLANE

806 — COUPLE A PLURALITY OF BLADE ASSEMBLIES TO THE UPPER ROTOR AND THE LOWER ROTOR, WHEREIN COUPLING THE PLURALITY OF BLADE ASSEMBLIES TO THE UPPER ROTOR AND THE LOWER ROTOR BLADE ASSEMBLY INCLUDES ATTACHING EACH BLADE ASSEMBLY OF THE PLURALITY OF BLADE ASSEMBLIES TO A RESPECTIVE ROTOR VIA AN OFFSET FLAPPING HINGE POSITIONED RADIALLY OUTWARD FROM A CENTRAL ROTATIONAL AXIS OF THE MULTI-PLANAR ROTOR ASSEMBLY, THE OFFSET FLAPPING HINGE HAVING A PRECONFIGURED DELTA-3 ANGLE VALUE

808 — ANGULARLY OFFSET THE UPPER ROTOR RELATIVE TO THE LOWER ROTOR BY A DEFINED ANGULAR OFFSET, WHEREIN THE ANGULAR OFFSET BETWEEN THE UPPER ROTOR AND THE LOWER ROTOR IS CONFIGURED TO ESTABLISH AN ANGULAR SPACING BETWEEN ADJACENT BLADE ASSEMBLIES OF THE PLURALITY OF BLADE ASSEMBLIES ACROSS THE FIRST VERTICAL PLANE AND THE SECOND VERTICAL PLANE

FIG. 8

ROTOR WITH OFFSET

STATEMENT REGARDING FEDERALLY SPONSORED RESEARCH OR DEVELOPMENT

This disclosure was made with Government support under Agreement No. W911W6-23-2-0001, awarded by the Army Contracting Command-Redstone Arsenal. The Government has certain rights in the invention.

TECHNICAL FIELD

The present disclosure generally relates to aircraft rotor assemblies, and more specifically to a rotor assembly with multi-planar offset flapping hinges.

BACKGROUND

In a typical aircraft, propeller blades are coupled to a rotor assembly. The rotor assembly typically includes a mast, a rotor hub, and a plurality of blade assemblies. The mast may be implemented as a hollow and cylindrical shaft that may extend upward from a transmission, which may provide rotation as well as structural support. The uppermost portion of the mast may include an attachment interface, which may include the rotor hub. The rotor hub may be configured to attach to the blade assemblies. The blade assemblies may be coupled to the rotor hub through different attachment mechanisms, which may allow specific degrees of freedom including, but not limited to, feathering, lead-lag, and flapping motions.

FIG. 1A illustrates an example configuration of a conventional single-plane rotor assembly 50. FIG. 1B shows a top-down view of the rotor assembly 50. As shown, the rotor assembly 50 may include a plurality of blade assemblies configured to be operatively coupled to a rotor hub 75.

In implementations, the blade assemblies attached to the rotor hub may be configured to allow various degrees of freedom, including but not limited to feathering, lead-lag, and flapping movements. In particular, flapping may include the ability of a blade assembly to move vertically relative to the rotor hub during flight. The vertical displacement may be enabled by a pivoting mechanism that includes a flapping hinge. For example, as illustrated in FIG. 1A, the blade assembly 10 may be attached to the rotor hub 75 through the flapping hinge 20, which may enable the blade assembly 10 to pivot vertically about the hinge axis during a flapping movement.

In some applications, such as those involving rotor assemblies with large diameters, flapping hinges may be implemented in an offset configuration. An offset flapping hinge may include a flapping hinge positioned at a radial distance outward from the central rotational axis of the rotor hub. For example, as shown in FIG. 1A, the flapping hinge 20 associated with the blade assembly 10 may be disposed at an offset from a central axis 75 of the rotor assembly 50. By positioning the flapping hinge at an offset distance, each blade assembly may be allowed an independent vertical flapping movement relative to the rotor hub, which may allow the blade assemblies to flap individually rather than collectively about a common central axis. In the offset flapping hinge configurations, each rotor blade assembly may include its own dedicated flapping hinge arranged circumferentially around the rotor hub at a radial offset from the central axis.

However, in rotor assemblies including a large number of blade assemblies (such as rotor assemblies utilizing six or more blade assemblies), the necessary chordwise spacing between offset flapping hinges may result in rotor hubs of considerable size and weight. This increased rotor hub size may generate substantial hub moments during operation that may need to be accommodated by the aircraft's drive system and structural components, including wings and support frameworks. Thus, it is generally preferable to minimize the offset distance of flapping hinges to reduce these generated loads.

Offset flapping hinge configurations do not scale well, however, particularly when implemented in rotor assemblies having very large diameters (e.g., rotor diameters of 60 feet or greater). These large diameter configurations, when employed in rotor assemblies with multiple blade assemblies arranged circumferentially in a single plane, may require each offset flapping hinge to have sufficient structural width and spacing to manage chordwise moments arising from blade lead-lag motion. Consequently, the cumulative effect of these structural constraints leads to a rotor hub of substantial circumferential dimension and frontal area. In these conventional implementations, the rotor hub circumference (e.g., defined by a circle circumscribing the flapping hinges arranged within the single plane) may tend to become large and may contribute to increased weight, aerodynamic drag, structural complexity, etc.

Another challenge with conventional single-plane offset flapping hinge configuration relates to maintenance. For example, in conventional single-plane rotor assemblies, adjacent blade assemblies may obstruct direct access to flapping hinge components. In particular, due to minimal or even no spacing between adjacent blade assemblies in the single-plane configuration, the removal of flapping hinge bolts or bearings may require the entire disassembly of hub components. For example, removal of the flapping hinge bolt for blade assembly 10 as shown in FIG. 1A, may require disassembly of the entire rotor hub, which may require removal of the rotor hub plate 70 that may include removal of a significant number of fasteners. This increases the complexity and duration of maintenance procedures, as multiple interconnected parts may have to be removed to gain access to individual flapping hinge components for inspection, servicing, replacement, and/or repair.

SUMMARY

The present disclosure achieves technical advantages as systems and devices for a multi-planar rotor assembly with offset flapping hinges. In particular embodiments, a multi-planar rotor assembly may include a plurality of rotors disposed at different vertically offset planes of a rotor hub. Each of the rotors may include a plurality of blade assemblies operatively coupled thereto using an offset flapping hinge. In embodiments, the different planes of the rotor hub may be vertically separated or stacked. For example, a rotor assembly may include an upper rotor disposed along a first plane arranged or offset vertically above a lower rotor disposed along a second plane. In embodiments, by vertically stacking rotors in separate vertically offset planes, reductions in hinge offset dimensions and overall hub frontal area may be enabled. In some embodiments, relative angular positioning (e.g., clocking) between rotors in different planes may be configured to ensure clearance for control linkages and alignment relative to desired or configured delta-3 angles.

In embodiments, the multi-planar rotor assembly may enable the use of reduced flapping hinge offset distances. For example, the multi-planar rotor assembly may include an upper rotor and a lower rotor, each rotor configured to support a subset of the total number of blade assemblies of the multi-planar rotor assembly. In one particular example, the multi-planar rotor assembly may include a total of six blade assemblies. In this example, the upper rotor may be configured to support three blade assemblies and the lower rotor may be configured to support three blade assemblies. By distributing the blade assemblies across separate vertically offset planes, the circumferential spacing of flapping hinges within each plane may be reduced (e.g., in comparison to a conventional single-plane rotor assembly with six blade assemblies and/or having a similar delta-3 angle), which may enable a corresponding decrease in the flapping hinge offset distance from the multi-planar rotor assembly's central axis. The reduction in flapping hinge offset may lead to decreased hub-generated moments during operation.

In embodiments, the reduced diameter of the rotor hub resulting from a multi-planar rotor configuration may provide a reduction in aerodynamic drag during axial flight operations. Moreover, the reduced flapping hinge offset and the smaller rotor hub diameter may contribute to lower structural loads and reduced weight. Additionally, decreased structural loads associated with smaller hinge offsets may allow for a reduction in the weight of related aircraft components, including transmission assemblies and wing support structures.

In embodiments, the increased angular spacing between blade assemblies within a given rotor plane of a multi-planar configuration (e.g., when compared to a traditional single-plane rotor assembly) may enable a wider chordwise distribution of blade attachment points. The widened angular spacing between adjacent blade assemblies may provide improved structural load paths for coupling out chord moments.

In embodiments, the delta-3 angle associated with each blade assembly may include the angle between the flapping hinge axis and the pitching axis of the blade assembly (e.g., see delta 3 angle 190 of FIG. 6). For example, the delta-3 angle may represent the angle formed between the axis of rotation defined by the flapping hinge and a line drawn from the flapping hinge to the attachment point of the pitch link to the pitch horn of the blade assembly. Different delta-3 angle values may be obtained by modifying the placement of the pitch axis (e.g. the pitch horn to which the pitch link attaches) relative to the rotor hub centerline. For example, positioning the pitch horn closer to the rotor hub centerline may result in a reduced delta-3 angle, whereas positioning the pitch horn farther outward may result in an increased delta-3 angle. Further discussion related to the delta-3 angle calculation and configuration is provided below with respect to FIGS. 5B-5D in accordance with embodiments of the present disclosure.

In some embodiments, such as in embodiments applicable to tiltrotor aircraft, may implement a target delta-3 angle of approximately-15 degrees, which may result in a positive coupling between blade flapping motion and pitch adjustments (e.g., a flap up-pitch up coupling).

In embodiments implementing a multi-planar rotor assembly with evenly spaced blade assemblies (e.g., where the angular spacing between adjacent blade assemblies is the same), interference between adjacent blade assemblies may result due to the relative location of pitch control components. For example, in a multi-planar configuration including six blade assemblies, three blade assemblies may be arranged on the upper rotor with an angular spacing of approximately 120 degrees between each blade assembly, and three blade assemblies may be arranged on the lower rotor also at approximately 120 degrees angular spacing. In embodiments, the upper and lower rotors may be angularly offset relative to one another, such as by approximately 60 degrees, which may result in an effective angular spacing of approximately 60 degrees between adjacent blade assemblies from different planes as viewed axially. However, in these evenly spaced configurations, a relatively small delta-3 angle, which may position the pitch horn proximate to the flapping hinge axis, may lead to interference in which the pitch link extending upward from the swashplate to the pitch horn of an upper rotor blade assembly may contact or otherwise interfere with the adjacent lower rotor blade assembly.

To address this potential issue with pitch control interference between adjacent blade assemblies, embodiments of the multi-planar rotor assembly may implement larger delta-3 angles, which may include up to approximately + or −32 degrees. The larger delta 3 angle may enable the pitch horn to be positioned farther outwardly on the blade assembly which may provide more clearance between the adjacent blade assemblies for the pitch control components and may prevent interference.

However, in some embodiments, the implementation of relatively large delta-3 angles may cause issues with flutter stability. To address this issue, embodiments of the present disclosure may implement a clocked multi-planar configuration in which the upper and lower rotor are angularly offset relative to each other in a scissored configuration, resulting in an uneven angular spacing between adjacent blade assemblies. In particular embodiments, the angular offset between the upper and lower rotor may be configured such that the angular spacing between adjacent upper and lower blade assemblies is different from a uniform angular spacing. For example, in embodiments, the angular spacing between a first upper rotor blade assembly and a first lower rotor blade assembly may be different from the angular spacing between the first upper rotor blade assembly and a second lower rotor blade assembly. In embodiments, this scissored or clocked rotor configuration may allow sufficient clearance for pitch links extending upward from a swashplate to the pitch horns of upper rotor blade assemblies, which may enable the multi-planar rotor assembly to be configured with smaller delta-3 angles without pitch control interference.

In addition, embodiments implementing the scissored rotor configuration may enable the use of a single swashplate for pitch control of both upper and lower rotor blade assemblies. The scissored angular spacing between rotor planes may provide sufficient clearance for pitch linkages, which may allow smaller delta-3 angles to be used while retaining the advantages associated with multi-planar rotor assemblies as described herein. In embodiments, the multi-planar rotor configuration may be configured with delta-3 angles within a range of approximately + and −45 degrees.

In embodiments, the angular offset or scissoring between the upper and lower rotor assemblies may be dependent, at least in part, on the desired configuration of the delta-3 angle. In particular, the specific scissoring angle between rotor planes may be configured based on the delta-3 angle used for the blade assemblies, as well as the radial displacement of the pitch horn relative to the rotor hub centerline. Additionally, configuring the multi-planar rotor assembly with vertically offset rotor planes may contribute to a smaller rotor hub diameter by allowing for reduced flapping hinge offsets. The reduced flapping hinge offset may lower structural loads transmitted through the rotor hub, resulting in weight benefits for associated rotor support structures and aircraft subsystems. Additionally, embodiments of the multi-planar configuration facilitate simplified maintenance procedures. For example, individual flapping hinges and bearings may be removed or serviced independently, without disassembly of the entire rotor assembly, due to increased spacing available between adjacent blade assemblies across different rotor planes. In embodiments, a smaller overall hub size may enable a reduced frontal area, which may result in the benefit of less drag.

It is an object of the disclosure to provide a multi-planar rotor assembly for offset flapping hinges. It is a further object of the disclosure to provide a method of manufacturing a multi-planar rotor assembly for offset flapping hinges. These and other objects are provided by the present disclosure, including at least the following embodiments.

In one particular embodiment, a multi-planar rotor assembly for offset flapping hinges is provided. The multi-planar rotor assembly includes an upper rotor disposed within a first vertical plane, a lower rotor disposed within a second vertical plane vertically offset from the first vertical plane, and a plurality of blade assemblies coupled to the upper rotor and the lower rotor. In embodiments, each blade assembly of the plurality of blade assemblies is attached to a respective rotor via an offset flapping hinge positioned radially outward from a central rotational axis of the multi-planar rotor assembly, the offset flapping hinge having a preconfigured delta-3 angle value. In embodiments, the upper rotor and the lower rotor are angularly offset relative to each other by a defined angular offset, and the angular offset between the upper rotor and the lower rotor is configured to establish an angular spacing between adjacent blade assemblies of the plurality of blade assemblies across the first vertical plane and the second vertical plane.

In another embodiment, a method of manufacturing a multi-planar rotor assembly for offset flapping hinges is provided. The method includes disposing an upper rotor within a first vertical plane, disposing a lower rotor within a second vertical plane vertically offset from the first vertical plane, and coupling a plurality of blade assemblies to the upper rotor and the lower rotor. In embodiments, coupling the plurality of blade assemblies to the upper rotor and the lower rotor blade assembly includes attaching each blade assembly of the plurality of blade assemblies to a respective rotor via an offset flapping hinge positioned radially outward from a central rotational axis of the multi-planar rotor assembly, the offset flapping hinge having a preconfigured delta-3 angle value. The method further includes angularly offsetting the upper rotor relative to the lower rotor by a defined angular offset. In embodiments, the angular offset between the upper rotor and the lower rotor is configured to establish an angular spacing between adjacent blade assemblies of the plurality of blade assemblies across the first vertical plane and the second vertical plane.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 8 shows an exemplary flow diagram 800 of operations for manufacturing a multi-planar rotor assembly in accordance with embodiments of the present disclosure.

Figure 1A:
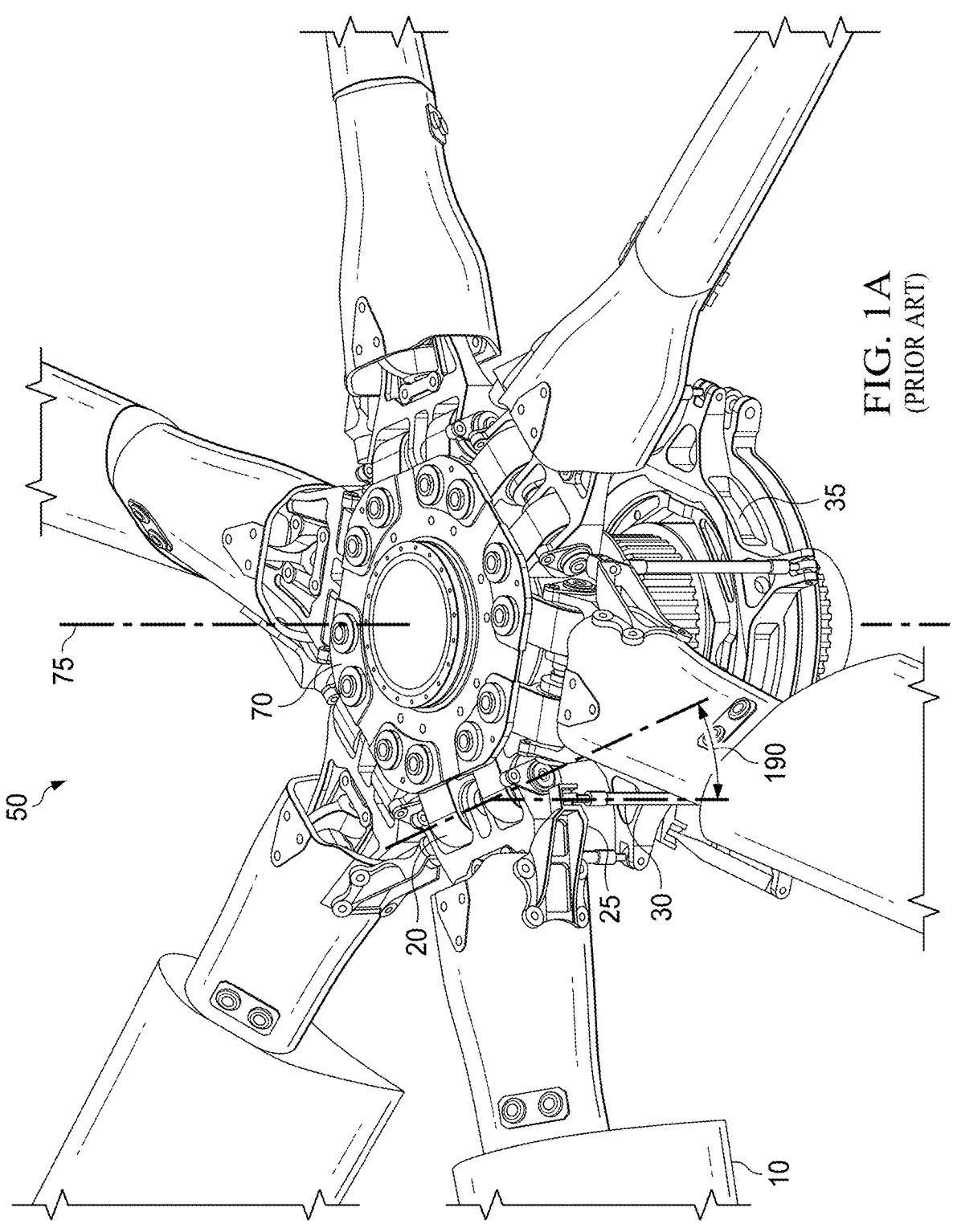
FIG. 1A illustrates an example configuration of a conventional single-plane rotor assembly.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to a multi-planar rotor assembly with offset flapping hinges. In particular embodiments, a multi-planar rotor assembly may include a plurality of rotors disposed at different vertically offset planes of a rotor hub. Each of the rotors may include a plurality of blade assemblies operatively coupled thereto using an offset flapping hinge. In embodiments, the different planes of the rotor hub may be vertically separated or stacked. For example, a rotor assembly may include an upper rotor disposed along a first plane arranged or offset vertically above a lower rotor disposed along a second plane. In embodiments, by vertically stacking rotors in separate vertically offset planes, reductions in hinge offset dimensions and overall hub frontal area may be enabled. In some embodiments, relative angular positioning (e.g., clocking) between rotors in different planes may be configured to ensure clearance for control linkages and alignment relative to desired or configured delta-3 angles.

Figure 1B:
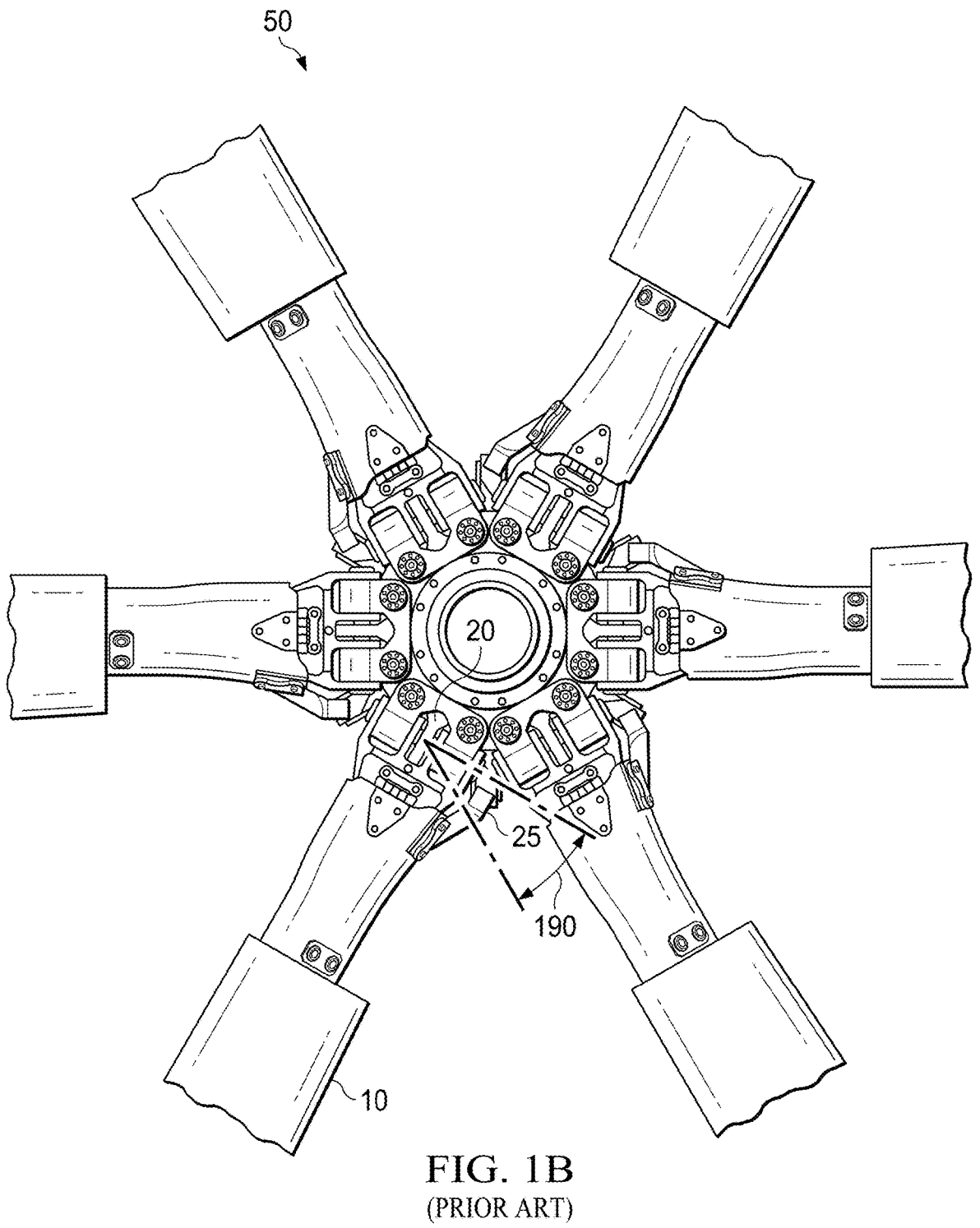
FIG. 1B shows a top-down view of the example configuration of a conventional single-plane rotor assembly.

FIG. 1A illustrates an example configuration of a conventional single-plane rotor assembly 50. FIG. 1B shows a top-down view of the single-plane rotor assembly 50. As shown, single-plane rotor assembly 50 represents a single-plane rotor assembly including offset flapping hinges. Each of the plurality of blade assemblies attached to single-plane rotor assembly 50 may include a flapping hinge positioned radially outward from a central axis 75 of the single-plane rotor assembly 50. For example, the blade assembly 10 may include a flapping hinge 20 positioned at an offset distance from the central axis 75. The blade assembly 10 may include a pitch horn 25 connected to a pitch link 30, which in turn may couple the blade assembly 10 to a swashplate 35. The delta-3 angle 190 associated with the blade assembly 10 may include the angle between a line extending through the flapping hinge axis and a second line extending from the flapping hinge axis to the attachment point of pitch link 30 on pitch horn 25.

However, as noted elsewhere herein, and as illustrated in FIG. 1B, in conventional single-plane rotor assemblies including a large number of blade assemblies (such as rotor assemblies utilizing six or more blade assemblies), the necessary chordwise spacing between offset flapping hinges may result in rotor hubs of considerable size and weight, which may generate substantial hub moments during operation. In addition, offset flapping hinge configurations do not scale well, because large diameter offset flapping hinge configurations may require each offset flapping hinge to have sufficient structural width and spacing to manage chordwise moments arising from blade lead-lag motion. Consequently, the cumulative effect of these structural constraints leads to a rotor hub of substantial circumferential dimension and frontal area, with increased weight, aerodynamic drag, structural complexity, etc.

FIG. 1A also illustrates how maintenance procedures involving replacement or servicing of offset flapping hinges may be complicated within conventional single-plane rotor assemblies because of limited space. In particular, flapping hinge components, such as flapping hinge bolts or bearings, typically cannot be extracted laterally without first removing other structural components of the single-plane rotor assembly 50, such as the rotor hub plate 70. This issue arises because adjacent blade assemblies, disposed with minimal angular spacing within the single-plane configuration, obstruct lateral access to flapping hinge components. Consequently, routine maintenance tasks involving flapping hinge removal or replacement may require extensive, long, and complex disassembly of other components just to be able to access the flapping hinge components.

Figure 2A:
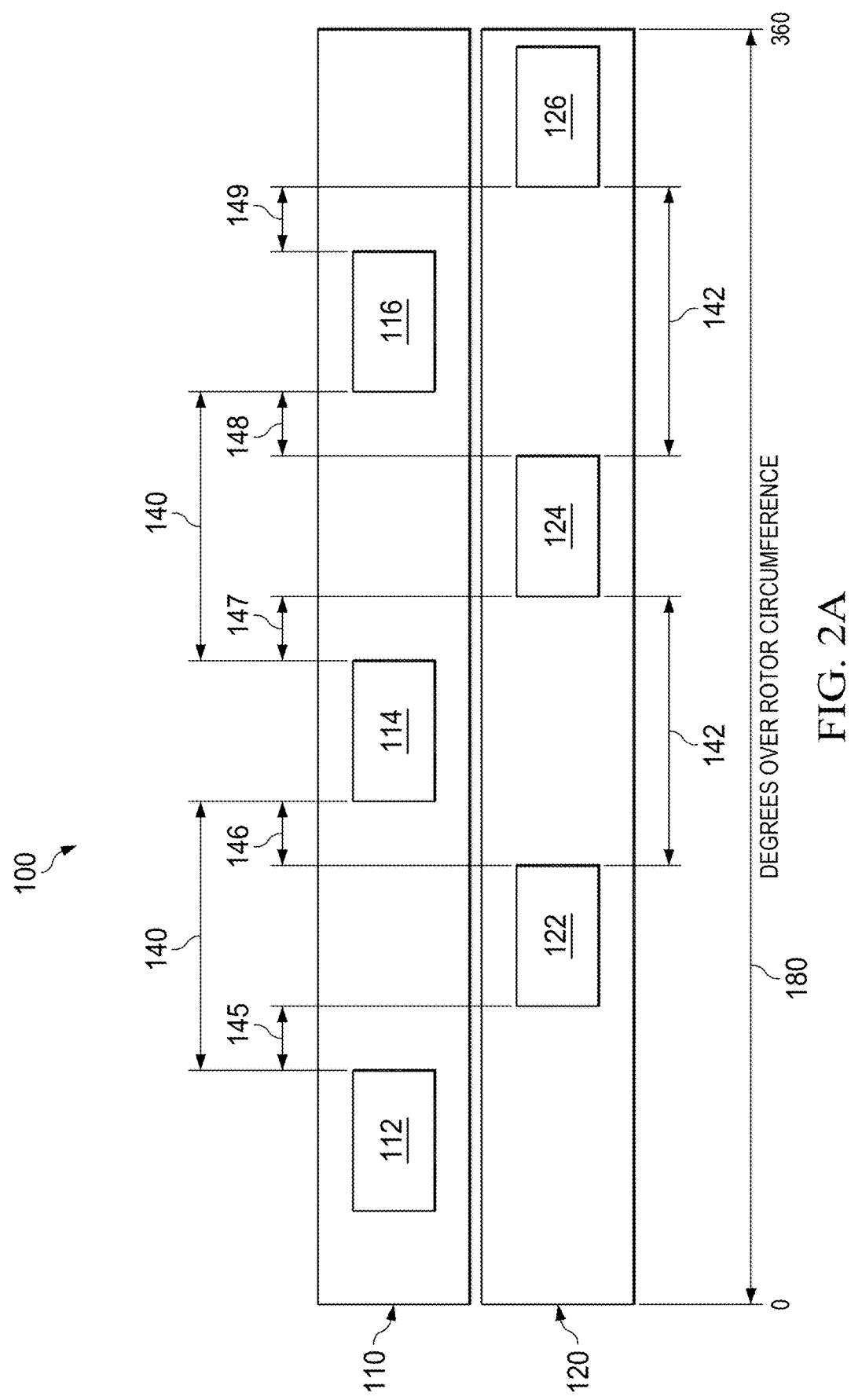
FIG. 2A shows a block diagram of an exemplary multi-planar rotor assembly for offset flapping hinge rotors configured in accordance with embodiments of the present disclosure.
Figure 3:
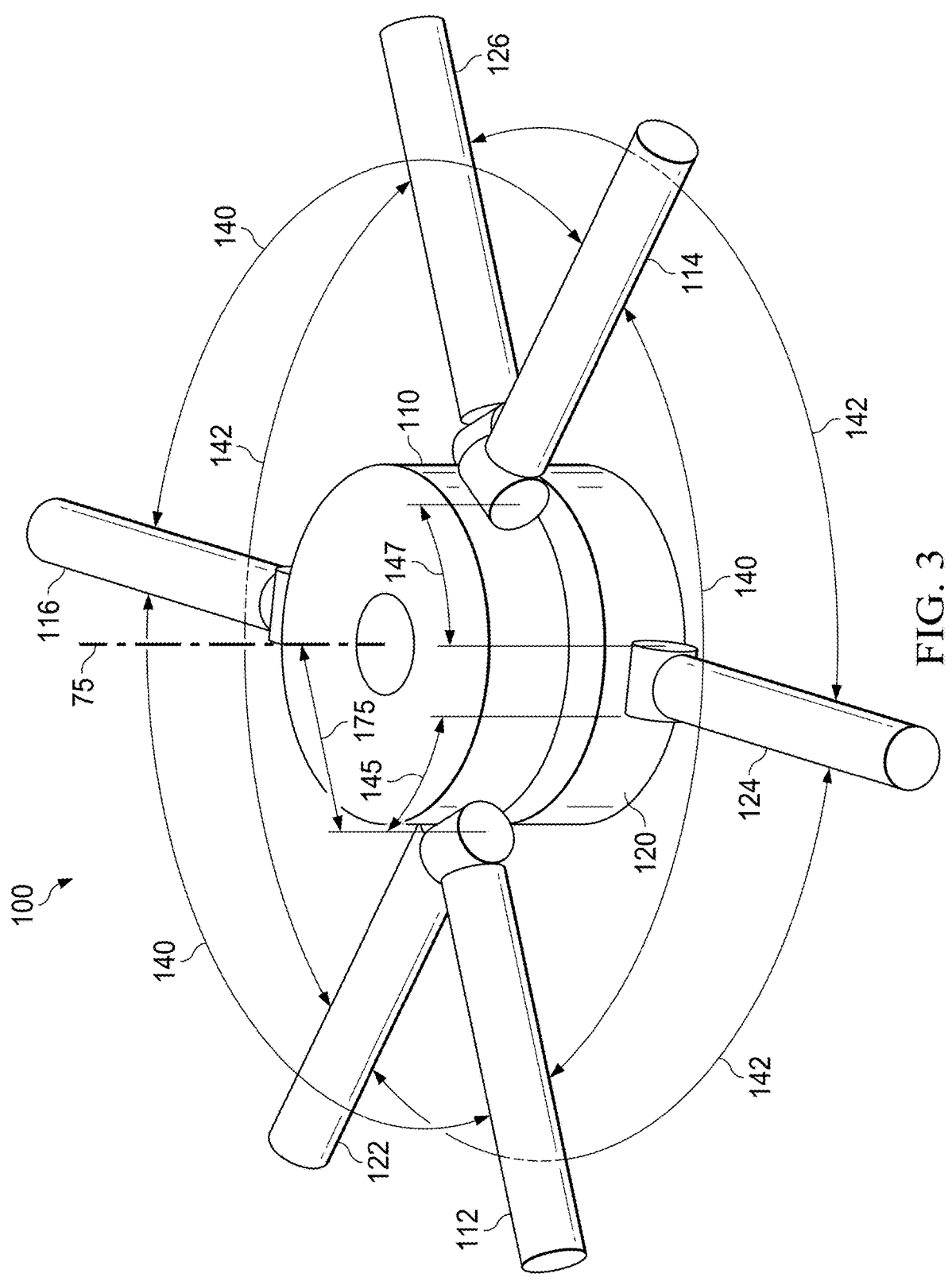
FIG. 3 shows a perspective view of the multi-planar rotor assembly for offset flapping hinge rotors configured in accordance with embodiments of the present disclosure.

FIG. 2A shows a block diagram of an exemplary multi-planar rotor assembly 100 for offset flapping hinge rotors configured in accordance with embodiments of the present disclosure. FIG. 2A illustrates a circumferential layout of the rotors and the blade assemblies of the multi-planar rotor assembly 100 in a planar projection. Although represented in a linearized form for clarity, it should be understood that the illustration in FIG. 2A corresponds to the rotor assembly circumference, which may be circular. FIG. 3 shows a perspective view of the multi-planar rotor assembly 100 for offset flapping hinge rotors configured in accordance with embodiments of the present disclosure. FIG. 3 further provides a visualization of the spatial arrangement of the rotors and the blade assemblies of the multi-planar rotor assembly 100 across different vertical planes.

In embodiments, the multi-planar rotor assembly 100 may include a plurality of rotors arranged at vertically separate planes along a central rotational axis. For example, an upper rotor 110 may be disposed within a first plane and a lower rotor 120 may be disposed within a second plane vertically offset from the first plane. In some embodiments, the second plane may be below the first plane. This vertically offset configuration may result in a stacked arrangement of the upper rotor 110 disposed vertically above the lower rotor 120.

In embodiments, each rotor of the multi-planar rotor assembly 100 may include a plurality of blade assemblies. For example, the upper rotor 110 may include blade assemblies 112, 114, and 116. The lower rotor assembly may include blade assemblies 122, 124, and 126. In embodiments, each of the upper rotor 110 and the lower rotor 120 may be configured such that blade assemblies are arranged circumferentially at predetermined angular intervals. In some embodiments, blade assemblies within a single rotor (e.g., within a single plane of the multi-planar rotor assembly 100) may be disposed at equal angular spacing. For example, in a rotor using three blade assemblies, the angular spacing between each adjacent blade assembly within the same rotor may be approximately 120 degrees. For example, as shown in FIG. 2, the angular spacing 140 between blade assemblies 112 and 114, between blade assemblies 114 and 116, and between blade assemblies 116 and 112, may be approximately 120 degrees. Similarly, the angular spacing 142 between blade assemblies 122 and 124, between blade assemblies 124 and 126, and between blade assemblies 126 and 122 may be approximately 120 degrees.

In embodiments, the angular spacing between blade assemblies within a single rotor (e.g., within a single plane of the multi-planar rotor assembly 100) may be determined based on the total number of blade assemblies employed per rotor (e.g., per rotor plane), the circumference of the rotor, and/or specific operational or structural requirements. In some embodiments, the angular spacing within the upper rotor 110 (e.g., the angular spacing 140 within the upper rotor 110) may be the same as the angular spacing within the lower rotor 120 (e.g., the angular spacing 142 within the lower rotor 120). In alternative or additional embodiments, different angular spacing configurations between the upper and lower rotos may be used, and these different angular spacing configurations may be based on operational and/or structural requirements.

In embodiments, the upper rotor 110 and the lower rotor 120 may be angularly offset relative to one another, which may result in a particular angular spacing between adjacent blade assemblies across different rotor planes. For example, the blade assembly 114 may be part of the upper rotor 110, while blade assembly 122 may be part of the lower rotor 120. In some embodiments, the blade assembly 122 may be disposed closer, from an angular spacing perspective, to blade assembly 114 than another blade assembly (e.g., blade assembly 112) within the same upper rotor 110. Thus, the angular spacing 146 between the blade assembly 122 of the lower rotor 120 and the blade assembly 114 of the upper rotor 110 may be smaller than the angular spacing 140 between the blade assembly 114 and the blade assembly 112 within the upper rotor 110. As a result, within the multi-planar rotor assembly 100, the blade assembly 122 may be considered adjacent to the blade assembly 114, even though the two blade assemblies are disposed in different rotors and in different vertical planes. Similarly, the blade assembly 124 of the lower rotor 120 may be considered adjacent to the blade assembly 114. In a similar manner, blade assembly 112 is adjacent to blade assembly 122 and blade assembly 126, and blade assembly 116 is adjacent to blade assembly 124 and blade assembly 126.

In embodiments, the upper rotor 110 and the lower rotor 120 may be angularly offset with respect to each other by a predetermined amount to control the angular spacing between adjacent blade assemblies across rotor planes. For example, an angular offset of approximately 60 degrees between the upper rotor 110 and the lower rotor 120 may result in a uniform angular spacing of approximately 60 degrees between adjacent blade assemblies. In particular embodiments, the angular spacing 145 between the blade assembly 112 of the upper rotor 110 and the blade assembly 122 of the lower rotor 120, the angular spacing 146 between the blade assembly 122 of the lower rotor 120 and the blade assembly 114 of the upper rotor 110, the angular spacing 147 between the blade assembly 114 of the upper rotor 110 and the blade assembly 124 of the lower rotor 120, the angular spacing 148 between the blade assembly 124 of the lower rotor 120 and the blade assembly 116 of the upper rotor 110, the angular spacing 149 between the blade assembly 116 of the upper rotor 110 and the blade assembly 126 of the lower rotor 120, and the angular spacing (not labeled) between the blade assembly 126 of the lower rotor 120 and the blade assembly 112 of the upper rotor 110, may each be approximately 60 degrees.

In certain embodiments, the angular offset between the upper rotor 110 and the lower rotor 120 may implement a scissored or clocked configuration, in which adjacent blade assemblies disposed in different planes of the multi-planar rotor assembly 100 may be separated by unequal or uneven angular intervals. For example, the blade assembly 114 of the upper rotor 110 may have two adjacent blade assemblies disposed within the lower rotor 120, namely blade assemblies 122 and 124. In embodiments, the angular spacing 146 between the blade assembly 114 of the upper rotor 110 and the blade assembly 122 of the lower rotor 120 may be different from the angular spacing 147 between the blade assembly 114 of the upper rotor 110 and the blade assembly 124 of the lower rotor 120. In particular embodiments, the scissored configuration of the multi-planar rotor assembly 100 may be configured such that the angular spacing between a blade assembly of the upper rotor 110 and an adjacent blade assembly of the lower rotor 120 is larger on the side of the upper rotor blade assembly where a pitch horn and pitch link of the upper rotor blade assembly may be located than the angular spacing on the other side of the upper rotor blade assembly. This configuration may facilitate and increase clearance between components of the adjacent blade assemblies which may operate to ensure that the pitch horn and pitch link associated with the upper rotor blade assembly do not interfere with the adjacent lower rotor blade assembly, regardless of the configured delta-3 angle.

It is noted that this clocked configuration (e.g., the scissored configuration of the multi-planar rotor assembly 100) of the multi-planar rotor assembly may allow the implementation of relatively smaller delta 3 angles (e.g., between + or −20 degrees) with the multi-planar rotor configuration of embodiments. For example, the uneven angular spacing configuration between adjacent blade assemblies disposed in different planes may allow for increased clearance between pitch control components (e.g., pitch horn and pitch link) of the upper rotor blade assemblies and the adjacent lower rotor blade assemblies. In this manner, the scissored rotor configuration may facilitate the use of reduced delta-3 angles by providing sufficient spacing to prevent interference between pitch control components and adjacent blade assemblies, even when pitch horns are located relatively close to corresponding flapping hinge axes.

Figure 2B:
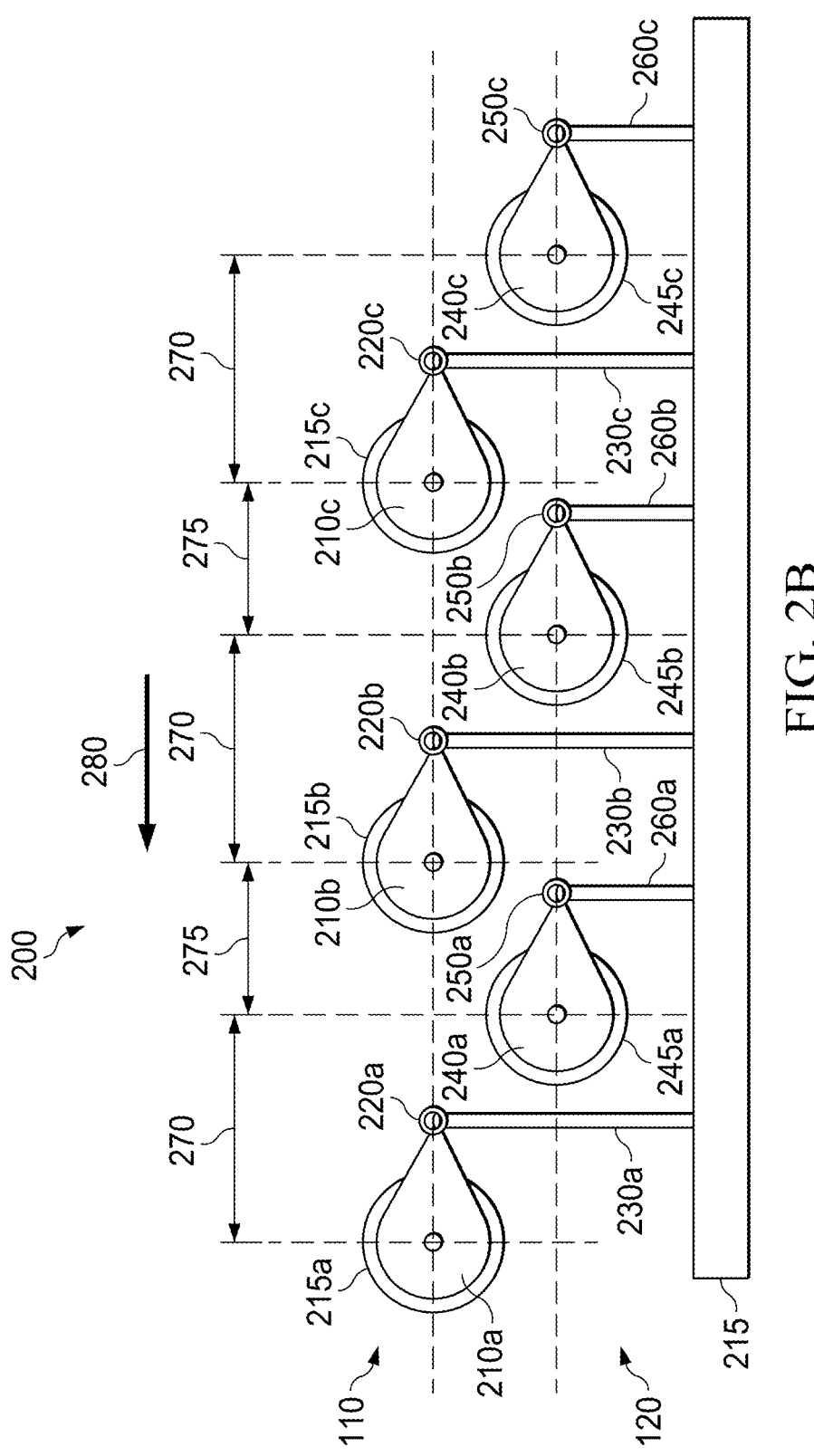
FIG. 2B shows a diagram of a particular embodiment of multi-planar rotor assembly for offset flapping hinge rotors configured in a scissoring configuration in accordance with embodiments of the present disclosure.

FIG. 2B shows a diagram of a particular embodiment of a multi-planar rotor assembly 200 for offset flapping hinge rotors configured in a scissoring configuration in accordance with embodiments of the present disclosure. As shown, the multi-planar rotor assembly 200 includes an upper rotor plane 110 and a lower rotor plane 120. In the upper rotor 110, a blade 210a is mounted to a cuff 215a and includes a pitch horn 220a that is coupled to a pitch link 230a. Similarly, in the upper rotor 110, a blade 210b is mounted to a cuff 215b and includes a pitch horn 220b that is coupled to a pitch link 230b, and a blade 210c is mounted to a cuff 215c and includes a pitch horn 220c that is coupled to a pitch link 230c. In the lower rotor 120, a blade 240a is mounted to a cuff 245a and includes a pitch horn 250a that is coupled to a pitch link 260a. Similarly, in the lower rotor 120, a blade 240b is mounted to a cuff 245b and includes a pitch horn 250b that is coupled to a pitch link 260b, and a blade 240c is mounted to a cuff 245c and includes a pitch horn 250c that is coupled to a pitch link 260c. As shown, the direction of rotation 280 indicates the direction in which the upper rotor 110 and the lower rotor 120 rotate during operation.

In embodiments, the blade assemblies of the upper rotor 110 and the lower rotor 120 of the rotor assembly 200 may be scissored, such that the angular spacing 270 between a blade assembly of the upper rotor and the adjacent blade assembly of the lower rotor is different from the angular spacing 275 between a blade assembly of the lower rotor and the adjacent blade assembly of the upper rotor. For example, as shown, the angular spacing 270 between the blade 210*a* of the upper rotor 110 and the adjacent blade 240*a* of the lower rotor 120 is different from the angular spacing 275 between the blade 240*a* and the adjacent blade 210*b* of the upper rotor 110. The similar configuration applies to the angular spacing between the other adjacent blade assemblies.

In embodiments, the scissored arrangement may be configured to ensure or provide a clearance between a blade and the adjacent pitch link across planes. For example, spacing 270 is configured so that the blade 240*a* of the lower rotor 120 does not contact or interfere with the pitch link 230*a* of the upper rotor 110 during operation, while spacing 275 is configured so that the blade 210*b* of the upper rotor 110 does not contact or interfere with the pitch link 260*a* of the lower rotor 120. In embodiments, because the blade 210*b* of the upper rotor 110 and the pitch link 260*a* of the lower rotor 120 are located in different rotor planes, spacing 275 may be smaller than spacing 270, while still providing sufficient clearance. In this manner, when viewed axially, the blade of the upper rotor 110 may be allowed to "overlap" the pitch link of the blade of the lower rotor 120 without interference.

Figure 4:
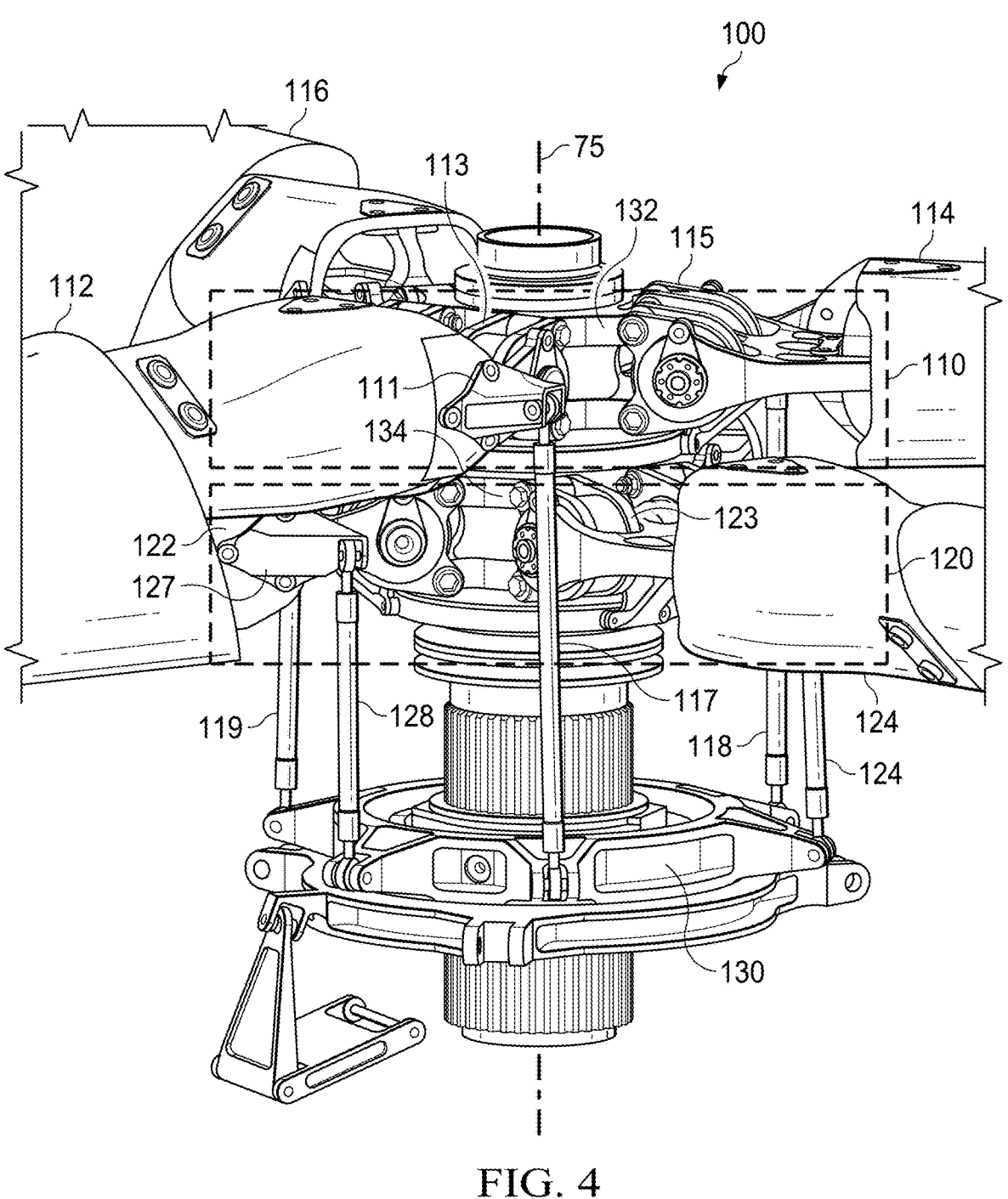
FIG. 4 illustrates a specific embodiment of the multi-planar rotor assembly for offset flapping hinge rotors configured in accordance with embodiments of the present disclosure.

FIG. 4 illustrates a specific embodiment of the multi-planar rotor assembly 100 for offset flapping hinge rotors configured in accordance with embodiments of the present disclosure. As shown, the multi-planar rotor assembly 100 includes the upper rotor 110 and the lower rotor 120, each disposed within a respective separate vertical plane. Each of the upper rotor 110 and the lower rotor 120 may include a plurality of blade assemblies. For example, the upper rotor 110 may include blade assemblies 112, 114, and 116, and the lower rotor 120 may include blade assemblies 122, 124, and 126.

It should be understood that the specific implementation shown herein with two rotors and with three blade assemblies per rotor plane is exemplary and provided for illustrative purposes only and should not be construed as limiting in any way. Indeed, in some embodiments, a different number of rotor planes and/or a different number of blade assemblies within each rotor plane may be used without departing from the scope of the present disclosure.

In embodiments, each of the upper rotor 110 and the lower rotor 120 may include a corresponding rotor hub. For example, the upper rotor 110 may include a rotor hub 132 and the lower rotor 120 may include a rotor hub 134. The rotor hubs may be configured to provide the structural support for mounting the components of the rotors and for receiving the blade assemblies. In embodiments, each blade assembly of the multi-planar rotor assembly may be coupled to a corresponding rotor via an offset flapping hinge. For example, the blade assembly 112 may be attached to the upper rotor hub 132 via the offset flapping hinge 113. Similarly, the blade assembly 114 may be attached to the upper rotor hub 132 via the offset flapping hinge 115. Although not shown in FIG. 4, the blade assembly 116 may be attached to the upper rotor hub 132 using an offset flapping hinge consistent with the blade assemblies 112 and 114. In embodiments, the lower rotor blade assembly 122 may be attached to the lower rotor hub 134 via the offset flapping hinge 123. Although not shown in FIG. 4, the lower rotor blade assemblies 124 and 126 may be attached to the lower rotor hub 134 using an offset flapping hinge consistent with the blade assembly 122.

As shown in FIG. 4, pitch control components associated with blade assemblies of multi-planar rotor assembly 100 may be operatively connected to a swashplate 130. In particular, a pitch link operatively connects to the swashplate 130 to a pitch horn of each blade assembly of the multi-planar rotor assembly. For example, the upper rotor 110 may include a pitch link 117 coupled to a pitch horn 111 of the blade assembly 112, a pitch link 118 coupled to a pitch horn (not shown) of the blade assembly 114, and a pitch link 119 coupled to a pitch horn (not shown) of the blade assembly 116. The lower rotor 120 may include a pitch link 128 coupled to a pitch horn 127 of the blade assembly 122, a pitch link 125 coupled to a pitch horn (not shown) of the blade assembly 124, and a pitch link (not shown) coupled to a pitch horn associated with blade assembly 126 (not shown).

Figure 5A:
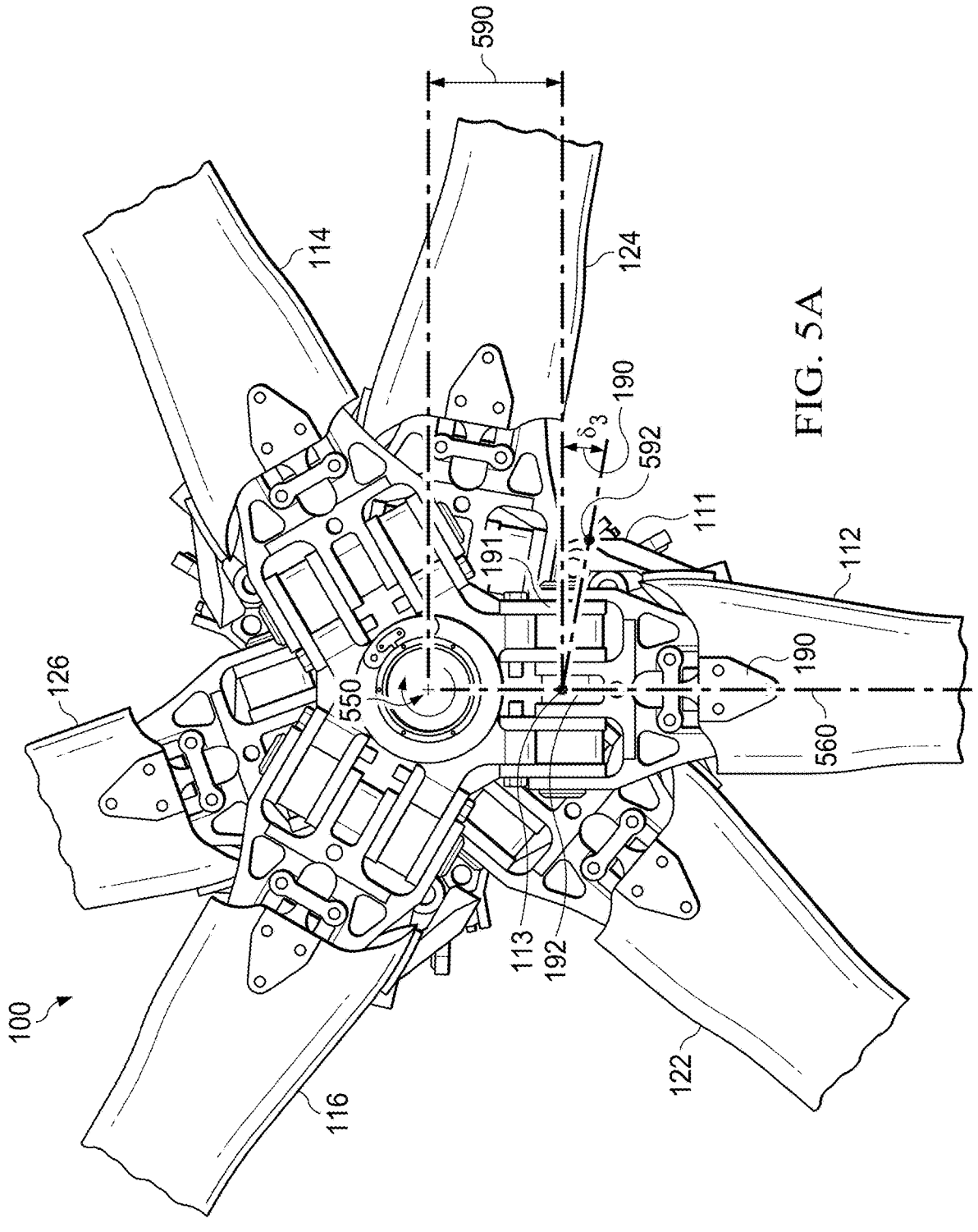
FIG. 5A shows a top-down view of the specific implementation of the multi-planar rotor assembly for offset flapping hinge rotors configured in accordance with embodiments of the present disclosure.

FIG. 5A shows a top-down view of the specific implementation of the multi-planar rotor assembly 100 for offset flapping hinge rotors configured in accordance with embodiments of the present disclosure. As can be seen in FIG. 5A, in embodiments, the multi-planar rotor assembly 100 using vertically stacked rotor planes with offset flapping hinges may present a circumferential profile that is reduced relative to conventional single-plane rotor assemblies configured with a comparable number of blade assemblies. For example, a single-plane rotor assembly including six blade assemblies with offset flapping hinges may typically have a significantly larger circumferential profile or diameter than the diameter or circumferential profile of the multi-planar rotor assembly 100 of FIG. 5, which includes six total blade assemblies. In this manner, embodiments of the multi-planar rotor assembly described herein enable substantial reductions in overall rotor assembly circumference, which in turn may result in reductions in spatial requirements, structural mass, aerodynamic drag in axial flight, etc.

As shown, the multi-planar rotor assembly 100 may include a rotor center 550, a pitch-change axis (PCA) 560, and a flapping-hinge offset distance 590, measured radially from the rotor center 550 to the intersection between the blade's flapping axis and the PCA (at the hinge 113). In embodiments, an attach point 592 may represent the attach point of the pitch horn 111 to the pitch link 111. In some embodiments, the hinge-offset distance 590 may be expressed as a ratio of hinge offset to rotor radius.

In embodiments, as described herein, reducing the hinge-offset distance 590 by distributing the blade assemblies across vertically separated planes may operate to decrease the hub diameter and hub-generated moments, with attendant drag and weight benefits. The PCA 560 and the location of the pitch-link attachment 191 relative to the flapping axis (through hinge 113) may operate to define the magnitude and sign of the delta-3 angle 190 for each blade assembly as described herein.

Figure 5B:
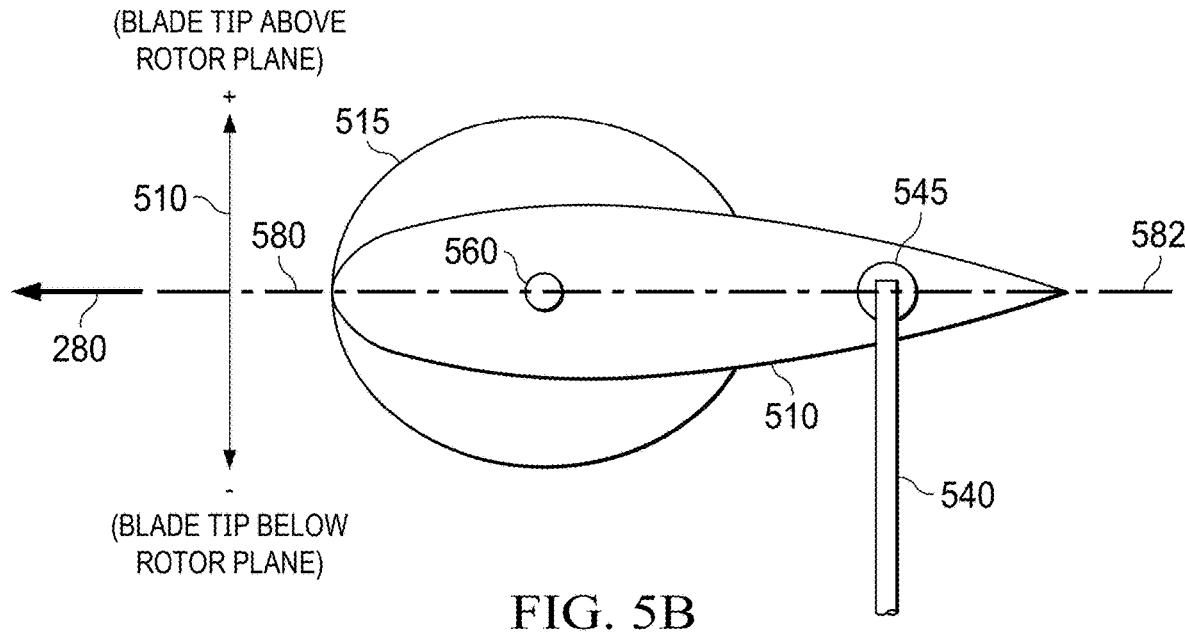
FIGS. 5B-5D are diagrams illustrating determination of a delta-3 angle sign in accordance with embodiments of the present disclosure.
Figure 5C:
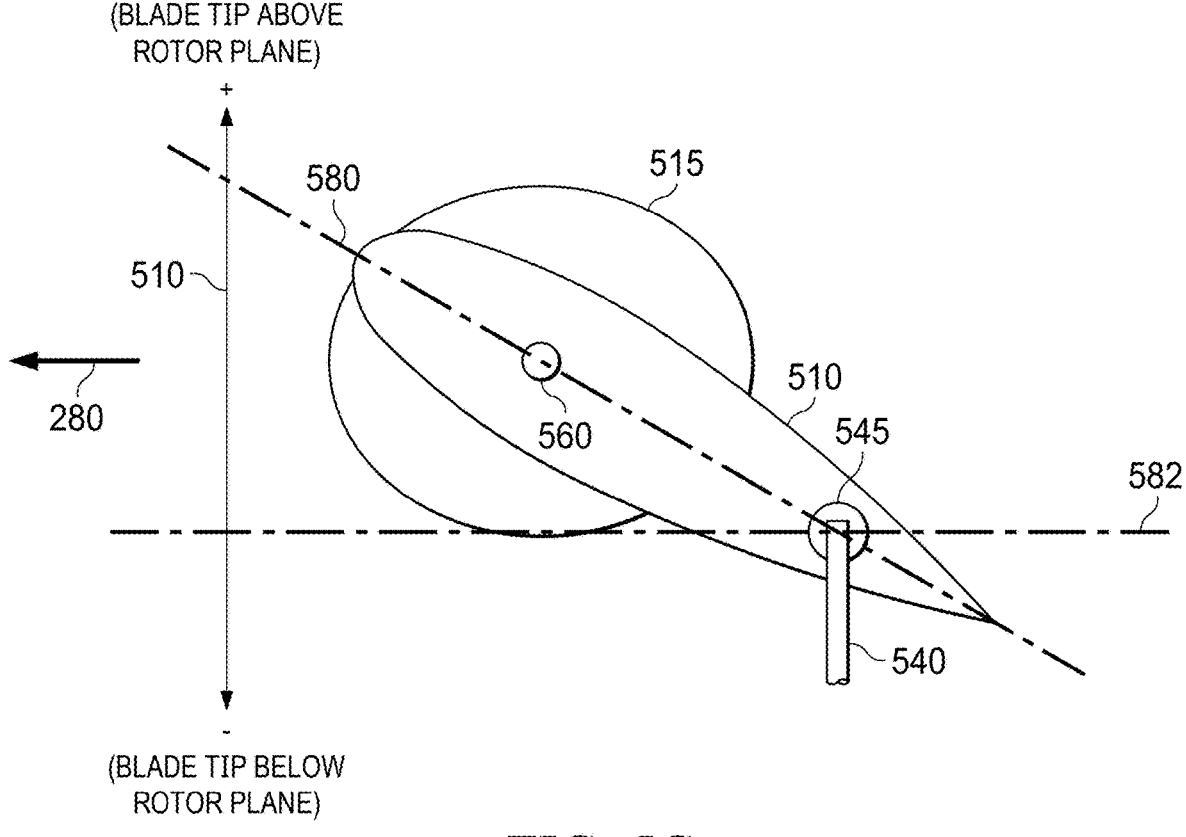
Figure 5D:
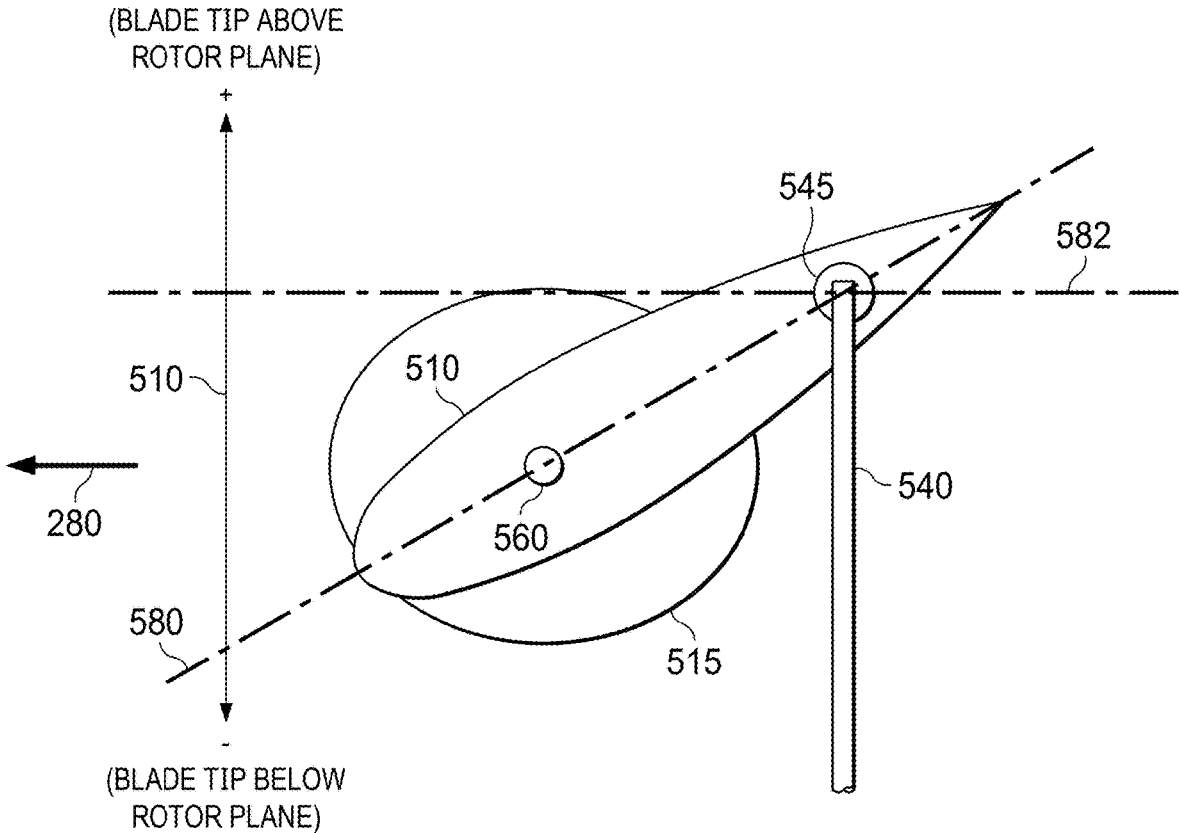

FIGS. 5B-5D are diagrams illustrating determination of a delta-3 angle sign in accordance with embodiments of the present disclosure. In embodiments, a blade 510 may be mounted to a cuff 515 and may rotate about the pitch-change axis 560. In this example, a blade chord plane 580 and a hub plane 582 are shown for reference. In embodiments, the pitch link 540 may attach to a pitch horn 545 on the blade 510/cuff 515 assembly. In embodiments, the direction of rotation 280 may indicate the direction in which the upper rotor 110 and the lower rotor 120 rotate during operation, and the flapping direction 510 may indicate the direction in which the blade 510 may flap during operation. As shown, "+" and "−" may represent the blade tip motion above and below the rotor plane, respectively.

In embodiments, as shown in FIG. 5C, a flap-up motion may couple to pitch-down, which may correspond to a positive delta-3 angle based on the orientation shown. In embodiments, as shown in FIG. 5D, a flap-up motion may couple to pitch-up, which may correspond to a negative delta-3 angle based on the orientation shown. A shown, FIGS. 5C and 5D illustrate a reference used herein for describing embodiments with positive or negative delta-3 and for selecting scissoring that maintains pitch-link/blade clearance across the stacked planes.

In embodiments, the reduced circumferential profile of the multi-planar rotor assembly 100 may advantageously decrease aerodynamic drag during axial flight conditions. In embodiment, the smaller hub diameter and reduced flapping hinge offset enabled by the multi-planar configuration of the multi-planar rotor assembly 100 may also contribute to reduced structural weight of the multi-planar rotor assembly 100. In additional embodiments, the lowered structural loads generated by smaller flapping hinge offsets may facilitate corresponding weight reductions in associated transmission assemblies, wing support structures, and/or other interconnected aircraft subsystems.

In embodiments, the multi-planar rotor assembly configuration may enable the multi-planar rotor assembly 100 to increase the angular spacing between blade assemblies within a plane relative to conventional single-plane configurations using the same total number of blade assemblies. For example, a single-plane rotor assembly using six blade assemblies may typically require uniform angular spacing of approximately 60 degrees between each adjacent blade assembly. In embodiments, implementing the multi-planar rotor assembly 100 may implement two vertically offset rotor planes, each supporting three blade assemblies. In these embodiments, the angular spacing between blade assemblies within a single plane of the multi-planar rotor assembly 100 may be increased to approximately 120 degrees. The increased angular spacing within each rotor plane may enable wider chordwise spacing between blade attachment points, which may provide a structurally efficient load path for transmitting and managing chordwise moments associated with blade lead-lag motions.

In embodiments, the multi-planar rotor assembly configuration of the multi-planar rotor assembly 100 may enable simplified maintenance of the offset flapping hinges when compared to conventional single-plane rotor assemblies. For example, as shown in FIG. 4, the vertically offset rotor planes of the upper rotor 110 and lower rotor 120 may operate to increase the angular spacing between adjacent blade assemblies positioned on different rotor planes. For example, the upper rotor blade assembly 112 and the adjacent lower rotor blade assembly 124 may be disposed within separate vertical planes. The increased spacing between the vertically offset and adjacent blade assemblies may allow lateral access to the flapping hinge components, such as flapping hinge 113, of the blade assembly 112, which may facilitate removal, servicing, repair, upgrade, etc. of the components of the flapping hinge 113 (e.g., the flapping hinge bolt, bearings, etc.) without disassembly of other rotor hub components. In contrast, conventional single-plane rotor assemblies may require partial or complete disassembly of the rotor hub to gain sufficient clearance to access the components of the flapping hinge for maintenance due to closely spaced, adjacent blade assemblies within a single horizontal plane.

As shown in FIG. 5A, the delta 3 angle of each blade assembly of the multi-planar rotor assembly 100, which may include the angle between the flapping hinge axis and the pitch axis (e.g., the point of attachment of the pitch link on the pitch horn), may be dependent on the position of the pitch axis. For example, in embodiments, the radial placement of the pitch horn relative to the rotor hub centerline may affect the value of the delta-3 angle. In particular embodiments, positioning the pitch horn closer to the central axis 75 of the rotor assembly 100 may result in a relatively smaller delta-3 angle, while positioning the pitch horn farther from the central axis 75 may increase the delta-3 angle. However, in multi-planar configurations employing smaller delta-3 angles, the proximity of pitch links associated with upper rotor blade assemblies to adjacent blade assemblies in lower rotor planes may result in component interference, as described herein. For example, the pitch link 117, which may couple the pitch horn 111 of the upper rotor blade assembly 112 to the swashplate 130, may come into proximity or contact with the lower rotor blade assembly 124 if pitch horn 111 is positioned too close to the central axis 75. As radial distance from the central axis 75 decreases, the available circumferential spacing between adjacent blade assemblies also decreases, which may increase the risk of interference between pitch control components and adjacent blade assemblies.

In some embodiments, the multi-planar rotor assembly 100 may address the potential component interference between adjacent blade assemblies by configuring blade assemblies with relatively larger delta-3 angles, which may ensure sufficient radial spacing for pitch control components. For example, the delta-3 angle may be configured with a value greater than + or −20 degrees, and in some embodiments up to + or −60 degrees, to provide sufficient clearance between adjacent blade assemblies across rotor planes, which may mitigate and/or prevent component interference risks. In some embodiments, configuring blade assemblies with larger delta-3 angles in the multi-planar rotor assembly 100 may allow the use of a single swashplate 130.

Figure 6:
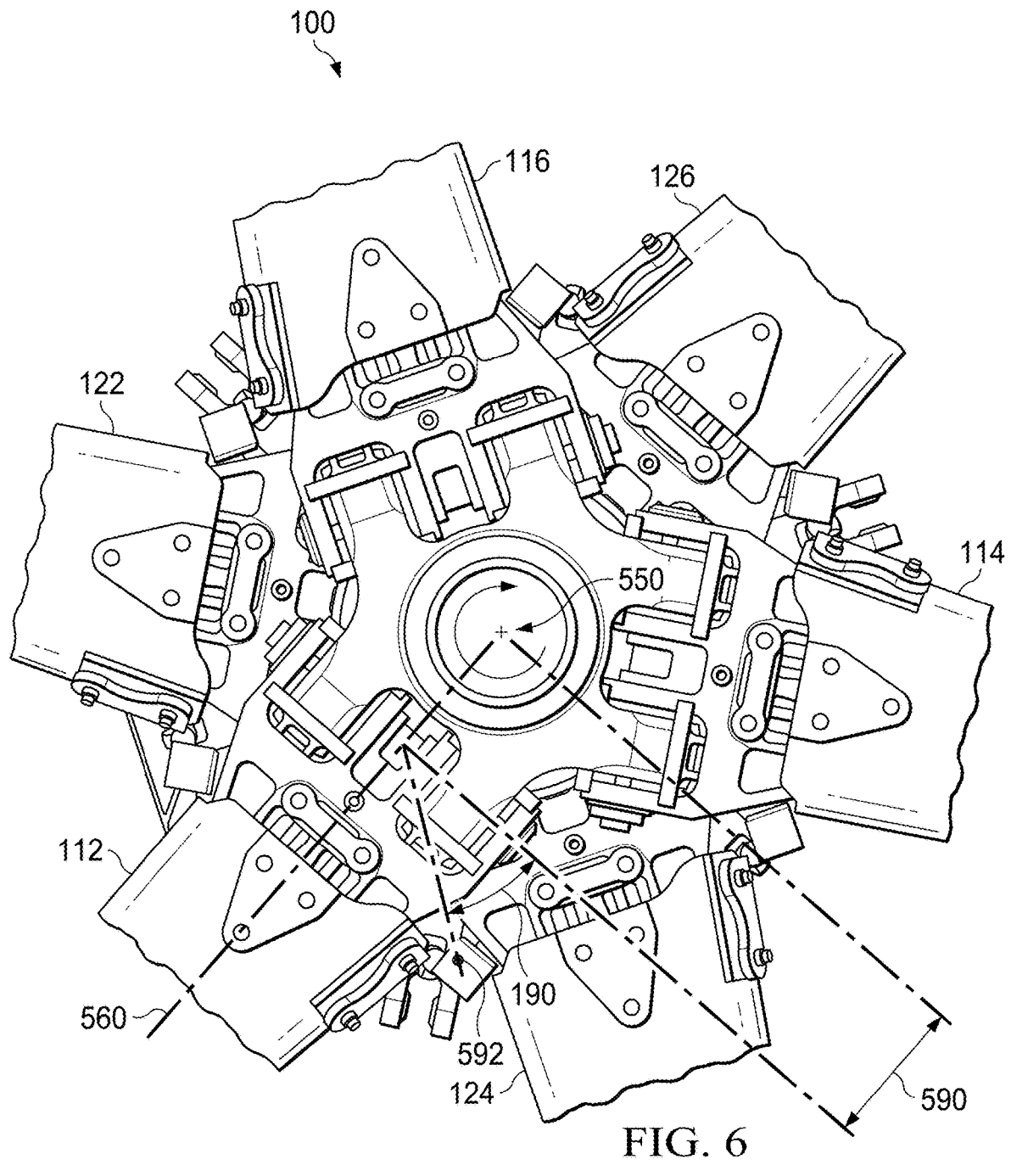
FIG. 6 shows a top-down view of the specific implementation of the multi-planar rotor assembly for offset flapping hinge rotors with even angular spacing configured in accordance with embodiments of the present disclosure.

In some embodiments, the use of relatively large delta-3 angles (e.g., approximately + or −20 degrees up to approximately + or −60 degrees) may enable even angular spacing configurations between adjacent blade assemblies across rotor planes. For example, as shown in FIG. 6, an increased delta-3 angle 190 may allow consistent angular spacing between blade assemblies of the upper rotor 110 and adjacent blade assemblies of the lower rotor 120. In these embodiments, the angular spacing between the upper rotor blade assembly 112 and the lower rotor blade assembly 122 may be substantially equivalent to the angular spacing between the upper rotor blade assembly 112 and the lower rotor blade assembly 124. In this manner, implementing a larger delta-3 angle may enable a uniform angular spacing between adjacent blade assemblies from different rotor planes within the multi-planar rotor assembly 100. It is noted that tiltrotors, in particular, are very sensitive to variations in the delta-3 angle value, and there is a "sweet spot" that minimizes potential for whirl-flutter instability, which is enabled by embodiments of the present disclosure allowing for a greater variance of delta-3 angle values.

Figure 7:
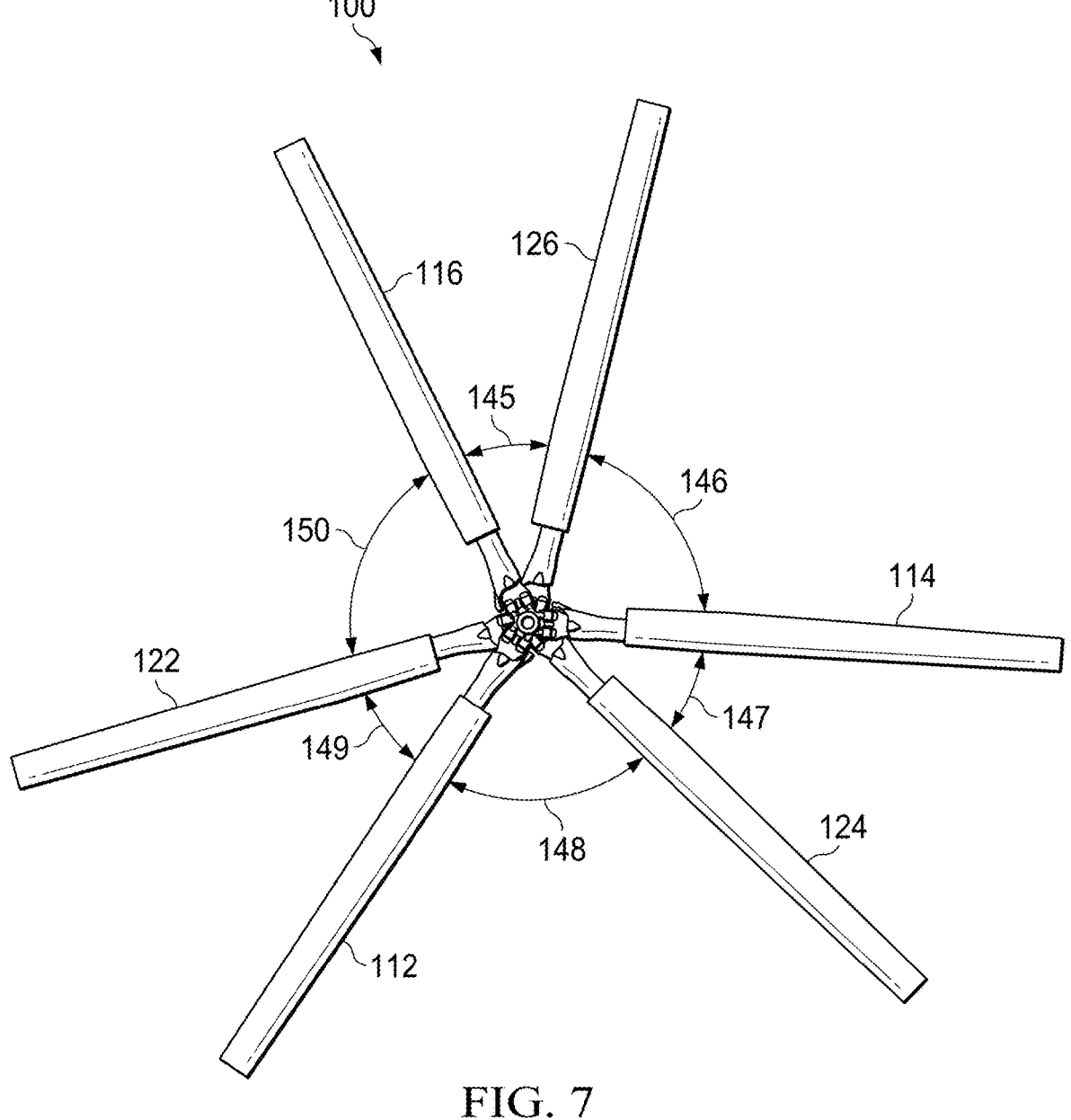
FIG. 7 shows a top-down view of a scissored configuration of the multi-planar rotor assembly for offset flapping hinge rotors configured in accordance with embodiments of the present disclosure.

In some embodiments, the multi-planar rotor assembly 100 may include a clocking or scissored configuration, in which the upper rotor 110 and the lower rotor 120 may be angularly offset relative to each other to establish an unequal or uneven angular spacing between adjacent blade assemblies. For example, as shown in FIG. 7, the upper rotor 110 and the lower rotor 120 may be angularly offset such that the angular spacing between adjacent blade assemblies from different rotor planes is non-uniform. In particular, the blade assembly 112 of the upper rotor 110 may be adjacent to the blade assemblies 122 and 124 of the lower rotor 120. In this example, the angular spacing 149 between blade assembly 112 and the blade assembly 122 may be different from the angular spacing 148 between the blade assembly 112 and the blade assembly 124. In embodiments with three blade assemblies per rotor plane, resulting in approximately 120-degree angular spacing within each rotor plane, the angular spacing between adjacent blade assemblies from different planes may differ from the nominal 60-degree spacing that may otherwise result without the scissored configuration.

In embodiments, the uneven angular spacing obtained from the scissored configuration between the upper rotor 110 and the lower rotor 120 may be configured to provide sufficient clearance for pitch control components, such as pitch links associated with upper rotor blade assemblies, to prevent component interference as described herein. For example, each blade assembly may include a pitch horn and a corresponding pitch link disposed on a particular radial side of the blade assembly. As shown in FIG. 7, the upper rotor blade assembly 112 may include a pitch horn and a pitch link positioned toward the adjacent lower rotor blade assembly 124, whereas the other side of the upper rotor blade assembly 112 (e.g., the side toward the lower rotor blade assembly 122) may not include pitch control components for blade assembly 112 (although this other side may include pitch control components for the lower rotor blade assembly 122).

It is noted that component interference may primarily involve pitch links of the upper rotor blade assemblies, because these pitch links traverse the lower rotor plane to connect with the upper rotor plane, which may create potential contact points with adjacent lower rotor blade assemblies. On the other hand, the pitch links associated with the lower rotor blade assemblies may not traverse into the upper rotor plane, and so there may not be potential component interference. As such, the scissored configuration may position blade assemblies such that greater angular spacing provided between upper rotor blade assemblies and adjacent lower rotor blade assemblies on the radial side where upper rotor pitch control components are disposed, whereas the angular spacing between upper rotor blade assemblies and adjacent lower rotor blade assemblies on the opposite radial side may be reduced.

For example, the uneven angular spacing may be configured to provide a greater angular spacing 148 between blade assembly 112 and blade assembly 124 than the angular spacing 149 between blade assembly 112 and blade assembly 122. Similarly, the uneven angular spacing may be configured to provide a greater angular spacing 146 between blade assembly 114 and blade assembly 126 than the angular spacing 147 between blade assembly 114 and blade assembly 124, and to provide a greater angular spacing 150 between blade assembly 116 and blade assembly 122 than the angular spacing 145 between blade assembly 116 and blade assembly 126

In some embodiments, the angular spacing configured in the scissored configuration between the upper rotor 110 and the lower rotor 120 rotor may result in some spacing intervals greater than approximately 60 degrees, while other spacing intervals may be less than approximately 60 degrees. For example, angular spacing intervals such as intervals 146, 148, and 150 may each be configured to exceed approximately 60 degrees, whereas angular spacing intervals such as intervals 145, 147, and 149 may each be configured to be less than approximately 60 degrees.

In embodiments, the larger angular spacing intervals (e.g., intervals 146, 148, 150) and the smaller spacing intervals (e.g., intervals 145, 147, 149) may be determined based at least in part on the particular delta-3 angle desired for the blade assemblies. For example, the angular spacing for preventing component interference between adjacent blade assemblies across rotor planes may be based on the selected delta-3 angle. In some embodiments, the delta-3 angle may be configured with a value within a range between + and −40 degrees, and in some embodiments, the delta-3 angle may be configured with a value within a range between + and −20 degrees.

A method of manufacturing a multi-planar rotor assembly for offset flapping hinges in accordance with embodiments of the present disclosure will now be discussed with respect to FIG. 8. FIG. 8 shows an exemplary flow diagram 800 of operations for manufacturing a multi-planar rotor assembly in accordance with embodiments of the present disclosure. For example, the steps illustrated in the example blocks shown in FIG. 8 may be performed to manufacture multi-planar rotor assembly 100, as illustrated in FIGS. 2-7, according to embodiments herein.

At block 802, an upper rotor is disposed within a first vertical plane. For example, an upper rotor (e.g., upper rotor 110 of FIGS. 2-7) may be disposed within a first vertical plane of a multi-planar rotor assembly (e.g., multi-planar rotor assembly 100 of FIGS. 2-7) according to configuration and functionality described with respect to embodiments of the present disclosure.

At block 804, a lower rotor is disposed within a second vertical plane vertically offset from the first vertical plane. For example, a lower rotor (e.g., lower rotor 120 of FIGS. 2-7) may be disposed within a second vertical plane of the multi-planar rotor assembly (e.g., multi-planar rotor assembly 100 of FIGS. 2-7), where the second vertical plane is vertically offset from the first vertical plane according to configuration and functionality described with respect to embodiments of the present disclosure.

At block 806, a plurality of blade assemblies is coupled to the upper rotor and the lower rotor. For example, a plurality of blade assemblies may be coupled to the upper rotor and the lower rotor, including a first subset of the plurality of blade assemblies (e.g., blade assemblies 112, 114, and 116 of FIGS. 2-7) coupled to the upper rotor (e.g., the upper rotor 110 of FIGS. 2-7) and a second subset of the plurality of blade assemblies (e.g., blade assemblies 122, 124, and 126 of FIGS. 2-7) coupled to the lower rotor (e.g., the lower rotor 120 of FIGS. 2-7) according to configuration and functionality described with respect to embodiments of the present disclosure.

In embodiments, coupling the plurality of blade assemblies to the upper rotor and the lower rotor blade assembly includes attaching each blade assembly of the plurality of blade assemblies to a respective rotor via an offset flapping hinge positioned radially outward from a central rotational axis of the multi-planar rotor assembly, the offset flapping hinge having a preconfigured delta-3 angle value.

In embodiments, attaching each blade assembly of the plurality of blade assemblies to a respective rotor may include attaching a first subset of the plurality of blade assemblies to the upper rotor and a second subset of the plurality of blade assemblies is attached to the lower rotor, evenly angularly spacing blades of the first subset of the plurality of blade assemblies attached to the upper rotor within the upper rotor by an angular spacing value, and evenly angularly spacing blades of the second subset of the plurality of blade assemblies attached to the lower rotor are evenly spaced angularly within the upper rotor by the angular spacing value.

In embodiments, the preconfigured delta-3 angle value may be greater than approximately + or −20 degrees, and the preconfigured delta-3 angle value may be configured to prevent component interference between adjacent blade assemblies across the first vertical plane and the second vertical plane.

In embodiments, the preconfigured delta-3 angle value may be less than approximately + or −20 degrees, and the preconfigured delta-3 angle value is configured to prevent component interference between adjacent blade assemblies across the first vertical plane and the second vertical plane.

At block 808, the upper rotor is angularly offset relative to the lower rotor by a defined angular offset. For example, the upper rotor (e.g., the upper rotor 110 of FIGS. 2-7) may be angularly offset relative the lower rotor (e.g., the lower rotor 120 of FIGS. 2-7) by a defined angular offset according to configuration and functionality described with respect to embodiments of the present disclosure. In embodiments, the angular offset between the upper rotor and the lower rotor may be configured to establish an angular spacing between adjacent blade assemblies of the plurality of blade assemblies across the first vertical plane and the second vertical plane.

In embodiments, the angular spacing value may be larger than an angular spacing separating blade assemblies of a single-plane rotor configuration including a same number of blade assemblies as in the plurality of blade assemblies and a same preconfigured delta-3 angle value. In embodiments, the angular offset between the upper rotor and the lower rotor may be configured to establish an uneven angular spacing between adjacent blade assemblies of the plurality of blade assemblies across the first vertical plane and the second vertical plane, the uneven angular spacing configured based on the preconfigured delta-3 angle value of the offset flapping hinge.

In embodiments, the height (e.g., the space) between the upper rotor and the lower rotor of the multi-planar rotor assembly may be configured to provide a clearance between a pitch horn/pitch link of a lower rotor and the blade/cuff of the upper rotor at the worst case blade pitch and flapping combination. For example, when configuring the delta-3 angle for a particular rotor assembly, a blade pitch and flapping configuration may be configured to attain the desired delta-3 angle. In this example, the blade pitch and flapping combination may be a worst-case, in which case the separation distance or height between the upper rotor and the lower rotor may be configured to ensure that, even at this worst-case blade pitch and flapping combination, the pitch horn/pitch link of the lower rotor does not contact or interfere with a blade/cuff of the upper rotor.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are in-tended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A multi-planar rotor assembly, comprising:
an upper rotor disposed within a first vertical plane;
a lower rotor disposed within a second vertical plane vertically offset from the first vertical plane; and
a plurality of blade assemblies coupled to the upper rotor and the lower rotor, wherein each blade assembly of the plurality of blade assemblies is attached to a respective rotor via an offset flapping hinge positioned radially outward from a central rotational axis of the multi-planar rotor assembly, the offset flapping hinge having a preconfigured delta-3 angle value,
wherein the upper rotor and the lower rotor are angularly offset relative to each other by a defined angular offset, wherein the angular offset between the upper rotor and the lower rotor is configured to establish an angular spacing between adjacent blade assemblies of the plurality of blade assemblies across the first vertical plane and the second vertical plane.

2. The multi-planar rotor assembly of claim 1, wherein the vertical offset between the first vertical plane and the second vertical plane is configured to reduce a flapping hinge offset of the offset flapping hinge relative to a single-plane rotor configuration including a same number of blade assemblies as in the plurality of blade assemblies and a same preconfigured delta-3 angle value.

3. The multi-planar rotor assembly of claim 2, wherein the reduced flapping hinge offset is configured to reduce a diameter of the multi-planar rotor assembly relative to the single-plane rotor configuration.

4. The multi-planar rotor assembly of claim 3, wherein the reduced diameter of the multi-planar rotor assembly is configured to decreases an aerodynamic drag during axial flight conditions relative to the single-plane rotor configuration.

5. The multi-planar rotor assembly of claim 4, wherein the reduced diameter of the multi-planar rotor assembly is configured to reduce an overall weight of the multi-planar rotor assembly relative to the single-plane rotor configuration.

6. The multi-planar rotor assembly of claim 2, wherein the reduced flapping hinge offset is configured to reduce multi-planar rotor assembly-generated moments transmitted through the multi-planar rotor assembly during operation.

7. The multi-planar rotor assembly of claim 1, wherein the vertical offset between the first vertical plane and the second vertical plane is configured to increase an angular spacing between blade assemblies within each respective rotor of the upper rotor and the lower rotor relative to a single-plane rotor configuration including a same number of blade assemblies as in the plurality of blade assemblies and a same preconfigured delta-3 angle value.

8. The multi-planar rotor assembly of claim 7, wherein the increased angular spacing between blade assemblies within each respective rotor plane is configured to provide access to components of the offset flapping hinge without prior disassembly of other components of the multi-planar rotor assembly.

9. The multi-planar rotor assembly of claim 1, wherein a first subset of the plurality of blade assemblies is attached to the upper rotor and a second subset of the plurality of blade assemblies is attached to the lower rotor, wherein blades of the first subset of the plurality of blade assemblies attached to the upper rotor are evenly spaced angularly within the upper rotor by an angular spacing value, and wherein blades of the second subset of the plurality of blade assemblies attached to the lower rotor are evenly spaced angularly within the upper rotor by the angular spacing value.

10. The multi-planar rotor assembly of claim 9, wherein the preconfigured delta-3 angle value is greater than approximately + or −20 degrees, and wherein the preconfigured delta-3 angle value is configured to prevent component interference between adjacent blade assemblies across the first vertical plane and the second vertical plane.

11. The multi-planar rotor assembly of claim 10, further comprising a single swashplate configured to provide pitch control for blade assemblies of both the upper rotor and the lower rotor.

12. The multi-planar rotor assembly of claim 9, wherein the angular spacing value is larger than an angular spacing separating blade assemblies of a single-plane rotor configuration including a same number of blade assemblies as in the plurality of blade assemblies and a same preconfigured delta-3 angle value.

13. The multi-planar rotor assembly of claim 1, wherein the angular offset between the upper rotor and the lower rotor is configured to establish an uneven angular spacing between adjacent blade assemblies of the plurality of blade assemblies across the first vertical plane and the second vertical plane, the uneven angular spacing configured based on the preconfigured delta-3 angle value of the offset flapping hinge.

14. The multi-planar rotor assembly of claim 13, wherein the preconfigured delta-3 angle value is less than approximately + or −20 degrees, and wherein the preconfigured delta-3 angle value is configured to prevent component interference between adjacent blade assemblies across the first vertical plane and the second vertical plane.

15. A method of manufacturing a multi-planar rotor assembly, comprising:
    disposing an upper rotor within a first vertical plane;
    disposing a lower rotor within a second vertical plane vertically offset from the first vertical plane;
    coupling a plurality of blade assemblies to the upper rotor and the lower rotor, wherein coupling the plurality of blade assemblies to the upper rotor and the lower rotor blade assembly includes attaching each blade assembly of the plurality of blade assemblies to a respective rotor via an offset flapping hinge positioned radially outward from a central rotational axis of the multi-planar rotor assembly, the offset flapping hinge having a preconfigured delta-3 angle value; and
    angularly offsetting the upper rotor relative to the lower rotor by a defined angular offset, wherein the angular offset between the upper rotor and the lower rotor is configured to establish an angular spacing between adjacent blade assemblies of the plurality of blade assemblies across the first vertical plane and the second vertical plane.

16. The method of claim 15, wherein attaching each blade assembly of the plurality of blade assemblies to a respective rotor includes:
    attaching a first subset of the plurality of blade assemblies to the upper rotor and a second subset of the plurality of blade assemblies is attached to the lower rotor;
    evenly angularly spacing blades of the first subset of the plurality of blade assemblies attached to the upper rotor within the upper rotor by an angular spacing value; and
    evenly angularly spacing blades of the second subset of the plurality of blade assemblies attached to the lower rotor are evenly spaced angularly within the upper rotor by the angular spacing value.

17. The method of claim 16, wherein the preconfigured delta-3 angle value is greater than approximately + or −20 degrees, and wherein the preconfigured delta-3 angle value is configured to prevent component interference between adjacent blade assemblies across the first vertical plane and the second vertical plane.

18. The method of claim 16, wherein the angular spacing value is larger than an angular spacing separating blade assemblies of a single-plane rotor configuration including a same number of blade assemblies as in the plurality of blade assemblies and a same preconfigured delta-3 angle value.

19. The method of claim 15, wherein the angular offset between the upper rotor and the lower rotor is configured to establish an uneven angular spacing between adjacent blade assemblies of the plurality of blade assemblies across the first vertical plane and the second vertical plane, the uneven angular spacing configured based on the preconfigured delta-3 angle value of the offset flapping hinge.

20. The method of claim 19, wherein the preconfigured delta-3 angle value is less than approximately + or −20 degrees, and wherein the preconfigured delta-3 angle value is configured to prevent component interference between adjacent blade assemblies across the first vertical plane and the second vertical plane.

\* \* \* \* \*